Sept. 10, 1929.　　H. A. TUTTLE　　1,727,624
REVERSING GEARING
Filed April 4, 1927　　2 Sheets-Sheet 1
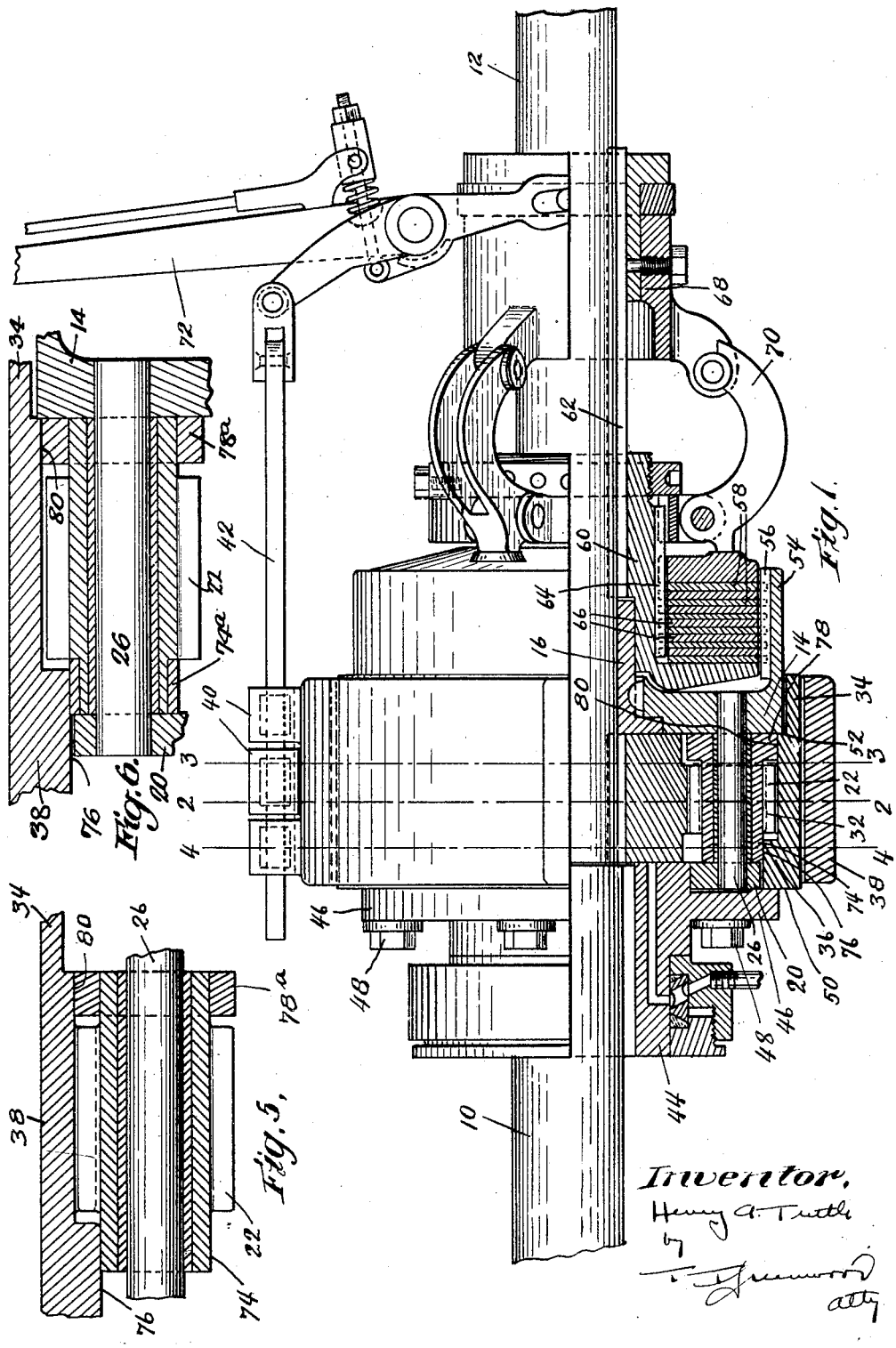

Sept. 10, 1929.     H. A. TUTTLE     1,727,624
REVERSING GEARING
Filed April 4, 1927     2 Sheets-Sheet 2
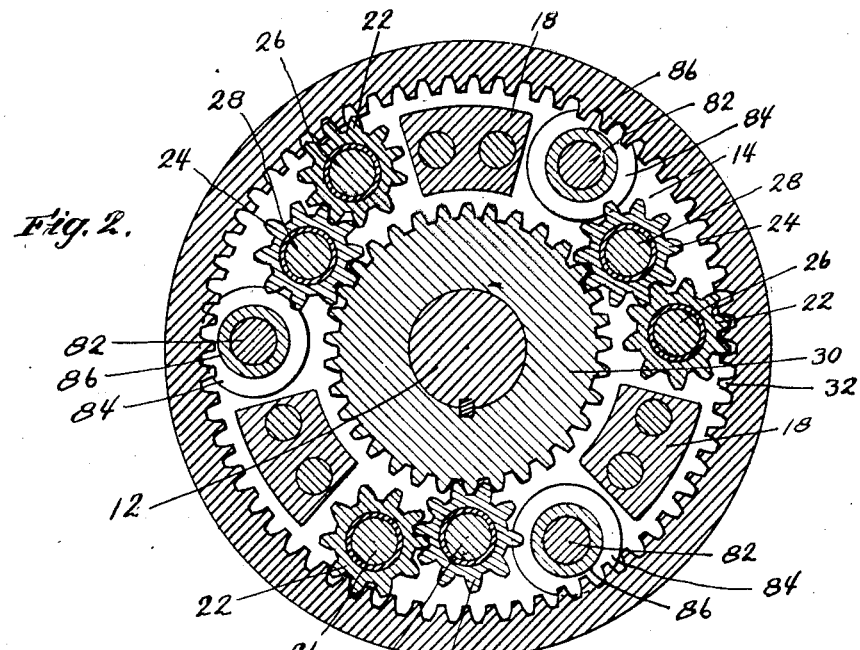
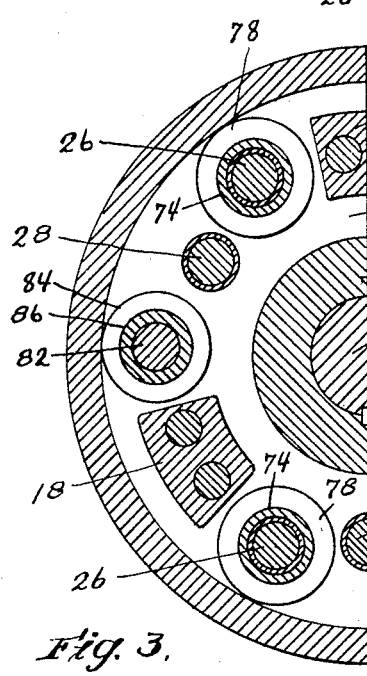
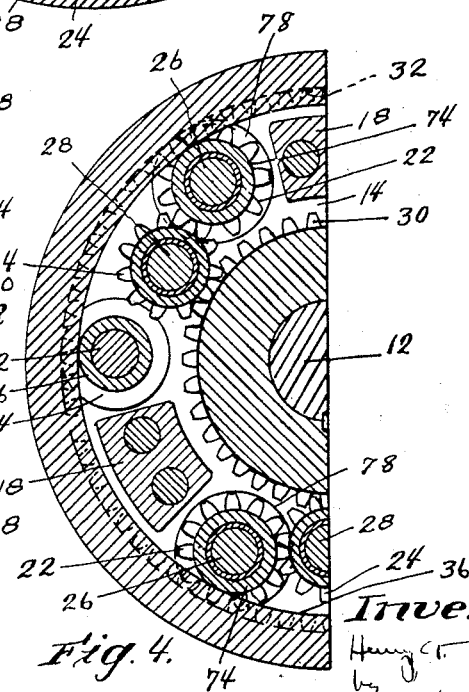

Patented Sept. 10, 1929.

1,727,624

UNITED STATES PATENT OFFICE.

HENRY A. TUTTLE, OF UPTON, MASSACHUSETTS.

REVERSING GEARING.

Application filed April 4, 1927. Serial No. 180,706.

This invention relates to reversing gearing and specifically to gearing of the type comprising aligned driving and driven shafts with planetary gearing elements including intermeshing pinion and internal gears connecting the shafts for reverse drive and clutch mechanism connecting the shafts for forward drive.

In reversing gearing of this type, the internal gear is usually engaged by a brake band which is adapted to hold the internal gear stationary and set the gearing for reverse drive and, in engaging, it has a tendency to move the internal gear slightly transversely of the shafts, thereby to cause the pinion gears to mesh with the teeth of the internal gear deeper than is designed, thus causing undue stresses and wear on the gear teeth.

An object of this invention is the provision of means to hold the internal gear and planetary pinions from meshing deeper than is designed.

A further object of the invention is the provision of rolling supports for the internal gear so arranged as to hold the gear in fixed radial relation with respect to the planetary pinion gears.

A yet further object is the provision of rolling supports for the internal gear associated with the planetary pinion gears.

This invention is particularly applicable to the reversing gearing shown in my copending application Serial No. 159,544, filed January 7, 1927, wherein the internal gear surrounds and is loose upon the outer periphery of the pinion gear carrier; and a further object of the invention is the provision of rolling supports for the free internal gear, which supports are associated with the pinion gears.

Fig. 1 is a side elevation partly in section of reversing gearing embodying the invention.

Figs. 2, 3 and 4 are sectional views along lines 2—2, 3—3 and 4—4 of Fig. 1, the brake band being omitted.

Fig. 5 is a sectional detail of a pinion gear illustrating a construction wherein the roller associated with the pinion gear is a separate element.

Fig. 6 is similar to Fig. 5 except that both rollers are loose on the pinion gear.

The invention here shown is applied to the reverse gearing illustrated in my above named application and includes aligned driving and driven shafts 10 and 12. A gear carrier surrounds the ends of the driving and driven shafts and comprises an outstanding circular plate 14 which has a bushing 16 freely rotatable on the driven shaft. Said plate is provided with axially-extended circumferentially-spaced integral lugs 18 in the outer periphery thereof, which lugs are integral with a ring 20 at their outer ends. Sets of meshing pinion gears 22 and 24 are disposed in the space between said ring 20 and plate 14 and are journalled on pins 26 and 28 respectively which are supported in said ring and plate. Said inner pinion gears 24 are arranged in constant mesh with a spur gear 30 disposed in the space between said ring 20 and plate 14 and fixed against rotation to the driven shaft 12. The outer pinion gears 22 are arranged in constant mesh with an internal gear 32 which surrounds the planetary pinion gears and has an extension 34 which is disposed about and has a bearing upon the periphery of the plate 14 and another extension 36 at the opposite end which extends about and has a bearing upon the periphery of the ring 20. A flexible brake band 38 encircles the outer periphery of said internal gear, which thus comprises a brake drum, and the proximate ends 40 of said brake band at the upper end of the gearing are adapted to be actuated by suitable mechanism including the rod 42 to compress the band about the internal gear to hold it stationary whereby to set the gearing for reverse drive. The internal gear is characterized by being otherwise free for rotation at will upon said gear carrier. A hub 44 is keyed to the driving shaft 10 and is provided with a radially-outstanding annular flange 46 which is secured to the lugs 18 and ring 20 by means of bolts 48 passed through said flange and screw threaded into said lugs, thereby forming in effect an integral structure with said plate 14 of the gear carrier. Said flange 46 is adapted to extend radially outward beyond the left hand end face 50 of the internal gear whereby to provide an abutment which holds the internal gear against axial displacement toward the left. The internal gear is formed with an annular shoulder 52 at the right hand end thereof which is adapted to engage the plate 14 which thereby serves as an abutment to prevent axially displacement of the internal gear towards the right. The internal gear may be removed from this aforesaid relation, following the removal of the bolts 48.

The plate 14 is provided with a cylindrical extension or drum 54 at the right hand end thereof which provides a compartment for the clutch mechanism. Said cylindrical extension is provided with internal gear teeth 56 which mesh with external gear teeth of a set of clutch plates 58. A hub 60 is slidably arranged on the driven shaft 12 and is fixed thereon by a key 62 against independent rotation therewith and has external gear teeth 64 which mesh with the internal gear teeth of a set of clutch plates 66 cooperating with the aforementioned set of plates. Suitable operating mechanism including the sliding sleeve 68 and links 70 serve to effect the engagement of the clutch plates and thereby to connect the shafts directly for forward drive and exclude the planetary gearing elements. The clutch and brake mechanisms are actuated by means including a common operating lever 72 and mechanism so arranged that the clutch and brake mechanisms can be set in an intermediate and neutral position wherein neither is actuated and the driven shaft is thereby free from positive driving connection with the driving shaft.

The construction above described is approximately as shown in my above named co-pending application.

When the brake band is contracted about the brake drum or internal gear, it usually tends to move the gear transversely of the gearing and thus increases unduly the depth of meshing of the teeth of the internal gears and the pinion gears, and ordinarily such transverse movement has not been prevented since there must be sufficient clearance between the internal gear and the side walls and periphery of the gear carrier to permit a free running fit between the gear and carrier and provide for an oil film between both. While this clearance is relatively small it is sufficient to permit enough lateral movement of the internal gear to cause the meshing of the gear teeth of the internal gear more deeply than is designed. This crowding of the gear teeth exerts undue strains upon the teeth and especially the teeth of the pinion gears and unless the gear teeth are made longer than is desirable, whereby to keep down the unit pressure, there is a tendency for the teeth to wear rapidly. In accordance with this invention means are provided to prevent the crowding together of the pinion and internal gears, or the meshing of their teeth beyond the designed amount, whereby to eliminate abnormal stresses and wear on the teeth and thus permit a decrease in the axial length of the gear teeth and consequently of the entire gearing.

In accordance with this invention, the pinion gears 22 are provided with axially extended hubs 74 on one side of the teeth thereof which hubs are designed to have a rolling engagement with the inner annular face 76 of the internal gear. Said pinion gears 22 at their opposite ends also are provided with hubs 78 which are adapted to have a rolling engagement upon a second annular face 80 of the internal gear. In the particular design here shown the hub 78 is larger in diameter than the hub 74, and also of the pinion gear teeth, so that the internal gear can be withdrawn from meshing engagement therewith for disassembling purposes.

In Fig. 1 the hubs 74 and 78 are integral with the pinion gear but they can be independent thereof and in Fig. 5 the hub 78$^a$ is a separate member and can either be driven thereon or in loose engagement therewith as may be desired. In Fig. 6 the other, or small, roller 74$^a$ is also loose on the pinion gear.

The difference in diameters of the hubs 74 and 78, and of the corresponding annular faces 76 and 80 of the internal gear are a measure of the depths to which the teeth of the pinion and internal gears can mesh and the teeth can not mesh deeper than is permitted by the engagement of said hubs with said annular faces, regardless of the amount of the transverse movement that the internal gear may have. The hubs of Fig. 5, with the loose hub 78$^a$, or both hubs or rollers of Fig. 6 have a pure rolling movement upon the annular faces of the internal gear since the pinion gears and the internal gear are positively connected through the meshing gear teeth. If desired, other rollers in addition to the hubs 74 and 78 associated with the pinion gears 22 may be provided as illustrated in Figs. 2, 3 and 4 wherein pins 82, similar to pins 26 and 28, carry large rollers 84 and small rollers 86 respectively which engage the faces 80 and 76 respectively of the internal gear and function as above described.

I claim:

1. Reversing gearing comprising the combination of driving and driven shafts, planetary gearing connecting said shafts for reverse drive including a spur gear fixed to one of said shafts, pinion gears surrounding said spur gear, an internal gear surrounding said pinion gear and in mesh with some of them, and a brake band in engagement with said internal gear to hold it stationary for reverse drive, said pinion gears having extensions on the similar sides thereof which have a diameter that is not greater than the root diameter of said pinion gears and have rolling engagement with said internal gear, said pinion gears also having loose rollers at their opposite similar ends which have a diameter that is not less than the tip diameter of said pinion gears and have rolling engagement with said internal gear.

2. Reversing gearing comprising the combination of driving and driven shafts, planetary gearing connecting said shafts for reverse drive including a spur gear fixed to one of said shafts, pinion gears surrounding said spur gear, an internal gear surrounding said pinion gears and in mesh with some of them, a brake band in engagement with said spur gear to hold it stationary for reverse drive, those pinion gears meshing with said internal gear characterized by having annular hubs disposed on opposite sides of the gear teeth which hubs comprise independently rotatable rollers having independent rolling engagement with said internal gear and providing support therefor.

3. In a gearing mechanism, a planetary pinion gear, an internal gear meshing with said pinion gear, and means to limit the depth of mesh between said gears comprising a large and a small roller associated with said pinion gear on opposite sides thereof having rolling engagement with opposed annular faces of said internal gear, said large roller being rotatable independently of said small roller.

4. Reversing mechanism comprising the combination of driving and driven shafts, gearing connecting said shafts for reverse drive including a gear carrier fixed to the driving shaft, a spur gear fixed to the driven shaft, planetary gearing elements including pinion gears carried by the gear carrier some of which gears are in mesh with the spur gear, a loose internal gear surrounding said pinion gears and in constant mesh with others of them, said loose internal gear characterized by being free at all times from positive driving connection with said driving and driven shafts, brake mechanism to hold said internal gear stationary for reverse drive including a brake band surrounding said internal gear and contractible into engagement therewith, and supporting large and small rollers for said internal gear associated with and disposed on opposite sides of said pinion gears and having rolling engagement with said internal gear, said floating internal gear being free for removal from the aforesaid relation by an axial movement thereof in the direction of the small rollers.

5. Gearing mechanism including a gear carrier having spaced plates with means detachably connecting them, pinion gears disposed between and carried by said plates, a floating internal gear surrounding said pinion gears and disposed between said plates and engaging them upon axial movement, and rolling supporting means for said internal gear comprising a small roller disposed on one side of a pinion gear, said roller characterized by having a diameter not greater than the root diameter of the pinion gear and having a rolling engagement with said internal gear, and a second roller disposed on the other side of said pinion gear and characterized by having a diameter not less than the outside diameter of said pinion gear and having a rolling engagement with said internal gear, said floating internal gear being removable from the aforesaid relation by an axial movement in the direction of the small roller and having an internal diameter at the side opposite said large roller which is not less than the internal diameter of that face thereof which is in rolling engagement with said large roller.

6. Reversing gearing including a gear carrier having spaced plates one of which is larger in diameter than the other, planetary gearing elements carried by and disposed between said plates and extended outwardly beyond at least the smaller one of said plates, an internal gear surrounding said gear carrier and gearing elements and forming the closure for the space between said plates and being loose on and closely surrounding both of said plates and having an internal diameter at least as great as the smaller one of said plates, large and small rollers associated with said planetary gearing elements and located respectively beside said large and small spaced plates, and said large roller having its periphery at least not within the periphery of said small plate, the aforesaid arrangement of plates, internal gear and rollers constituting means providing the removal of said internal gear from the aforesaid relation by an axial movement thereof.

7. Reversing gearing comprising driving and driven shafts, a pinion gear carrier having spaced large and small plates connected with said driving shaft, a spur gear connected with said driven shaft, pinion gears carried and located between said plates and within the periphery of said large plate, an internal gear closely surrounding both of said plates and meshing with said pinion gears, large and small rollers associated with said pinion gears and located at said large and small plates respectively, said small rollers being located at least not within the periphery of said small plate and said large rollers being located at least not beyond the periphery of said large plate, whereby said internal gear can be removed from the aforesaid relation by an axial movement in the direction of said small rollers.

In testimony whereof, I have signed my name to this specification.

HENRY A. TUTTLE.